US011397081B2

(12) United States Patent
Priest

(10) Patent No.: US 11,397,081 B2
(45) Date of Patent: Jul. 26, 2022

(54) METHOD AND APPARATUS FOR DETERMINING A TUBULAR THICKNESS USING A PULSE ECHO WAVEFORM SIGNAL

(71) Applicant: John F. Priest, Houston, TX (US)

(72) Inventor: John F. Priest, Houston, TX (US)

(73) Assignee: BAKER HUGHES OILFIELD OPERATIONS LLC, Houston, TX (US)

(*) Notice: Subject to any disclaimer, the term of this patent is extended or adjusted under 35 U.S.C. 154(b) by 0 days.

(21) Appl. No.: 16/916,434

(22) Filed: Jun. 30, 2020

(65) Prior Publication Data

US 2021/0404798 A1 Dec. 30, 2021
US 2022/0187064 A9 Jun. 16, 2022

Related U.S. Application Data

(60) Provisional application No. 62/869,880, filed on Jul. 2, 2019.

(51) Int. Cl.
*G01B 17/02* (2006.01)
*E21B 47/00* (2012.01)
(Continued)

(52) U.S. Cl.
CPC .............. *G01B 17/02* (2013.01); *E21B 47/00* (2013.01); *E21B 29/002* (2013.01); *E21B 43/116* (2013.01)

(58) Field of Classification Search
CPC ...... E21B 47/00; E21B 29/002; E21B 43/116; G01B 17/02
See application file for complete search history.

(56) References Cited

U.S. PATENT DOCUMENTS 4,912,683 A * 3/1990 Katahara .............. G01B 17/02
367/25
5,146,432 A * 9/1992 Kimball ............... G01N 29/09
367/13
(Continued)

FOREIGN PATENT DOCUMENTS

EP 0395499 A2 * 10/1990 ............... G01V 1/50
EP 3053522 A1 * 8/2016 ............. A61B 5/126
(Continued)

OTHER PUBLICATIONS

International Search Report for International Application No. PCT/US2020/040231; International Filing Date Jun. 30, 2020; dated Oct. 15, 2020; 3 pages.
(Continued)

*Primary Examiner* — Daniel P Stephenson
(74) *Attorney, Agent, or Firm* — Cantor Colburn LLP

(57) ABSTRACT

A method for characterizing a tubular includes obtaining acoustic waveform data in a time domain using an acoustic transducer configured to emit an acoustic signal and receive a return acoustic signal and transforming the acoustic waveform data into a frequency domain to provide frequency domain acoustic waveform data. The method also includes determining a complex group delay function $G_k$ derived from the frequency domain acoustic waveform data to provide a phase delay function as a function of frequency, wherein the complex group delay function $G_k$ represents a first derivative of phase in the frequency domain with respect to frequency. The method further includes determining an imaginary component function of the complex group delay function $G_k$ to provide a phase delay function as a function of frequency and characterizing the tubular using the phase delay function.

20 Claims, 9 Drawing Sheets

(51) Int. Cl.
*E21B 29/00* (2006.01)
*E21B 43/116* (2006.01)

(56) References Cited

U.S. PATENT DOCUMENTS

| | | | | |
|---|---|---|---|---|
| 5,274,604 | A * | 12/1993 | D'Angelo | G01V 1/50 367/35 |
| 5,491,668 | A * | 2/1996 | Priest | G01B 17/02 367/35 |
| 5,638,337 | A * | 6/1997 | Priest | G01V 11/005 367/27 |
| 5,737,277 | A * | 4/1998 | Priest | G01V 11/005 367/27 |
| 6,125,079 | A * | 9/2000 | Birchak | G01V 1/44 181/104 |
| 9,103,196 | B2 * | 8/2015 | Zhao | G01V 1/44 |
| 9,625,273 | B2 | 4/2017 | Kuroda et al. | |
| 9,766,363 | B2 * | 9/2017 | Morys | G01V 11/007 |
| 10,324,218 | B2 * | 6/2019 | Nichols | G01B 7/10 |
| 2015/0085611 | A1 * | 3/2015 | Mandal | E21B 47/005 367/82 |
| 2015/0338378 | A1 * | 11/2015 | Lu | E21B 47/107 73/632 |
| 2016/0109604 | A1 * | 4/2016 | Zeroug | G01V 1/50 367/13 |
| 2016/0109605 | A1 * | 4/2016 | Bose | E21B 47/005 367/35 |
| 2019/0145241 | A1 * | 5/2019 | Yao | E21B 47/12 348/85 |
| 2020/0033494 | A1 * | 1/2020 | Patterson | E21B 49/00 |
| 2020/0150304 | A1 * | 5/2020 | Han | E21B 47/005 |

FOREIGN PATENT DOCUMENTS

| | | | | |
|---|---|---|---|---|
| JP | 06097165 B2 | | 11/1994 | |
| WO | WO-9922200 A1 | * | 5/1999 | ............ G01B 17/02 |
| WO | WO-2021003120 A1 | * | 1/2021 | ........... E21B 47/005 |

OTHER PUBLICATIONS

Written Opinion for International Application No. PCT/US2020/040231; International Filing Date Jun. 30, 2020; dated Oct. 15, 2020; 5 pages.

* cited by examiner

METHOD AND APPARATUS FOR DETERMINING A TUBULAR THICKNESS USING A PULSE ECHO WAVEFORM SIGNAL

BACKGROUND

Downhole production boreholes utilized in subterranean operations typically utilize casings disposed therein to protect the borehole from downhole pressures, chemical reactions and other conditions and prevent failures such as borehole collapse, burst and tensile failures. Casings can also be used to define production zones in various portions of the borehole.

Casing monitoring and evaluation techniques are important tools in maintaining the integrity of the casing, and in turn maintaining the integrity of the borehole. Typical evaluation and maintenance procedures involve interrogating the casing and cement that is used to bond the casing to a borehole wall. The thickness of the casing is an important factor in testing for casing integrity and for well abandonment.

BRIEF SUMMARY

Disclosed is a method for characterizing a tubular. The method includes: obtaining acoustic waveform data in a time domain using an acoustic transducer configured to emit an acoustic signal and receive a return acoustic signal; transforming, by a processor, the acoustic waveform data into a frequency domain using a frequency domain transform to provide frequency domain acoustic waveform data; determining, by a processor, a complex group delay function $G_k$ derived from the frequency domain acoustic waveform data to provide a phase delay function as a function of frequency, wherein the complex group delay function $G_k$ represents a first derivative of phase in the frequency domain with respect to frequency; determining, by the processor, an imaginary component function of the complex group delay function $G_k$ to provide a phase delay function as a function of frequency; and characterizing, by the processor, the tubular using the phase delay function.

Also disclosed is an apparatus for characterizing a tubular disposed in a borehole penetrating a subsurface formation. The apparatus includes: an acoustic transducer configured to emit and receive an acoustic signal to provide to provide acoustic waveform data in a time domain and a processor. The processor is configured to: transform the acoustic waveform data in the time domain into a frequency domain using a frequency domain transform to provide frequency domain acoustic waveform data; determine a complex group delay function $G_k$ derived from the frequency domain acoustic waveform data to provide a phase delay function as a function of frequency, wherein the complex group delay function $G_k$ represents a first derivative of phase in the frequency domain with respect to frequency; determine an imaginary component function of the complex group delay function $G_k$ to provide a phase delay function as a function of frequency; and characterize the tubular using the phase delay function.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

Disclosed are methods and apparatuses for characterizing a tubular disposed in a borehole penetrating a subsurface formation. A non-limiting embodiment of the tubular can be a casing that may be cemented or bonded to the subsurface formation. A characterizing process includes transmitting an acoustic signal and receiving an acoustic return signal in response to the transmitted acoustic signal. Characterization of the tubular may include determining the thickness of the tubular. Characterization may also include determining a condition of the bond, such as the bond being completely present, partially present, and/or absent. Other types of tubular and/or bond characterization may also be obtained. The disclosed methods and apparatuses may also be used for other types of tubulars such as tubulars disposed at or above the surface of the earth and for purposes other than producing hydrocarbons.

Various techniques are disclosed for processing the acoustic return signal to provide a characterization having more accuracy than prior art techniques also using acoustic signals. Each of the techniques makes use of the imaginary part of a complex group delay waveform that is discussed further below. The complex group delay waveform is generally determined by calculation from the waveform of the acoustic return signal using a Fourier transform to obtain a frequency domain function $\mathfrak{F}(f\omega)$, where $\omega$ is the angular frequency, where $\omega = 2\pi f$.

Note: The term complex used herein is where the number has the form $z = a + i\,b$ and $i = \sqrt{-1}$ sometimes j is used instead of i.

Figure 1:
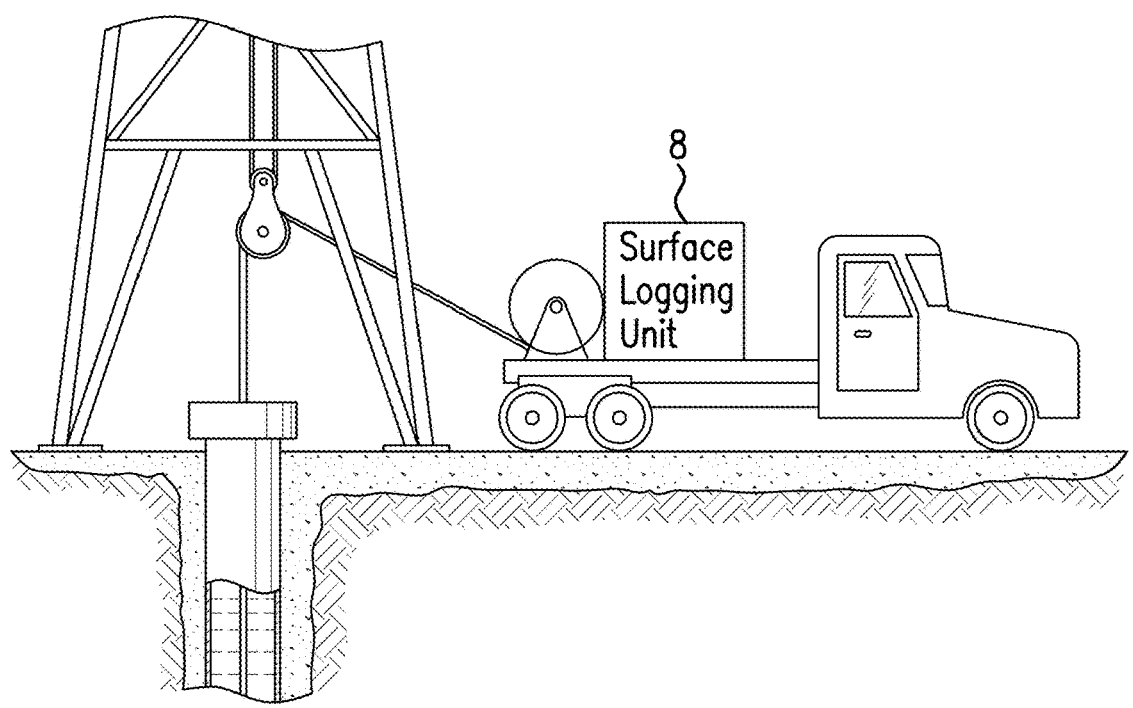
FIG. 1 is a cross-sectional view of an embodiment of an acoustic tool disposed in a wellbore penetrating a subsurface formation.
Figure 1:
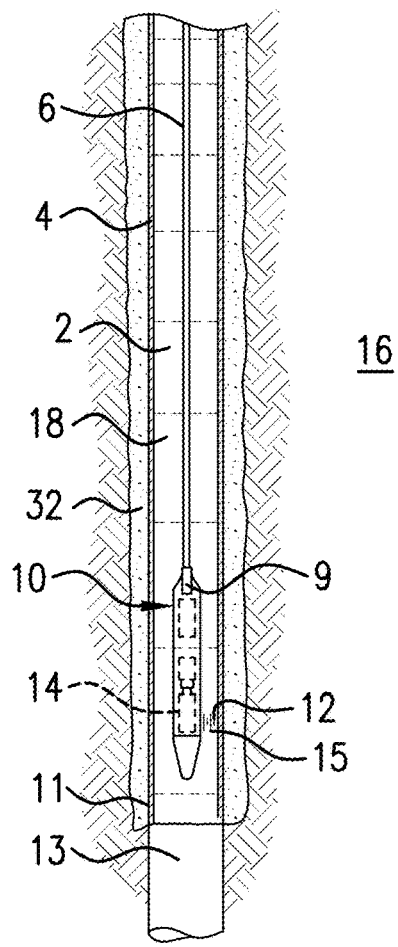

Discussed next is principle of operation of the apparatus. FIG. 1 shows an acoustic pulse-echo imaging tool 10 as it is used in a wellbore or borehole 2. The acoustic pulse-echo imaging tool 10, called the tool for brevity, is lowered to a desired depth in the wellbore 2 by means of a carrier such an electric wireline or cable 6. Power to operate the tool 10 is supplied by a surface logging unit 8 connected to the other end of the cable 6. Signals acquired by the tool 10 are transmitted through the cable 6 to the surface logging unit 8 for processing and presentation. Other non-limiting examples of the carrier include a drill string and coiled tubing, e.g. for pipe conveyed logging and for logging while drilling.

During the process of drilling the wellbore 2, a casing 4 is set in the wellbore 2 and may or may not be cemented in place with concrete in the annulus 32 between the casing and formation. At the bottom of the casing 4 is a casing shoe 11. Drilling the wellbore 2 continues after cementing of the casing 4 until a desired depth is reached. At this time, the tool 10 is generally run in an open-hole 13, which is a portion of the wellbore 2 deeper than the casing shoe 11. The tool 10 is usually run in the open-hole 13 for evaluating a subsurface formation 16 penetrated by the wellbore 2. Sometimes evaluation of the subsurface formation 16 proceeds to a depth shallower than the casing shoe 11, and continues into the part of the wellbore 2 in which the casing 4 is located. The casing 4 can be representative of any tubular disposed within the well bore and may be bonded or cemented in the wellbore 2, or the annulus 32 may be filled with a fluid, more specifically liquid or gas.

The tool 10 has a transducer section 14 from which an acoustic pulse 12 is emitted. The acoustic pulse 12 travels through a liquid 18 which fills the wellbore 2. The liquid 18 may be water, water-based solution of appropriate chemicals, or drilling mud. When the acoustic pulse 12 strikes the wall of the wellbore 2, or the casing 4, at least part of the energy in the acoustic pulse 12 is reflected back toward the tool 10 as a reflection (or return signal) 15. The transducer section 14 is then switched to receive the reflection 15 of the acoustic pulse 12 from the wall of the wellbore 2, or from the casing 4. The reflection 15 contains data which are useful in evaluating the earth formation 16 and the casing 2.

Figure 2:
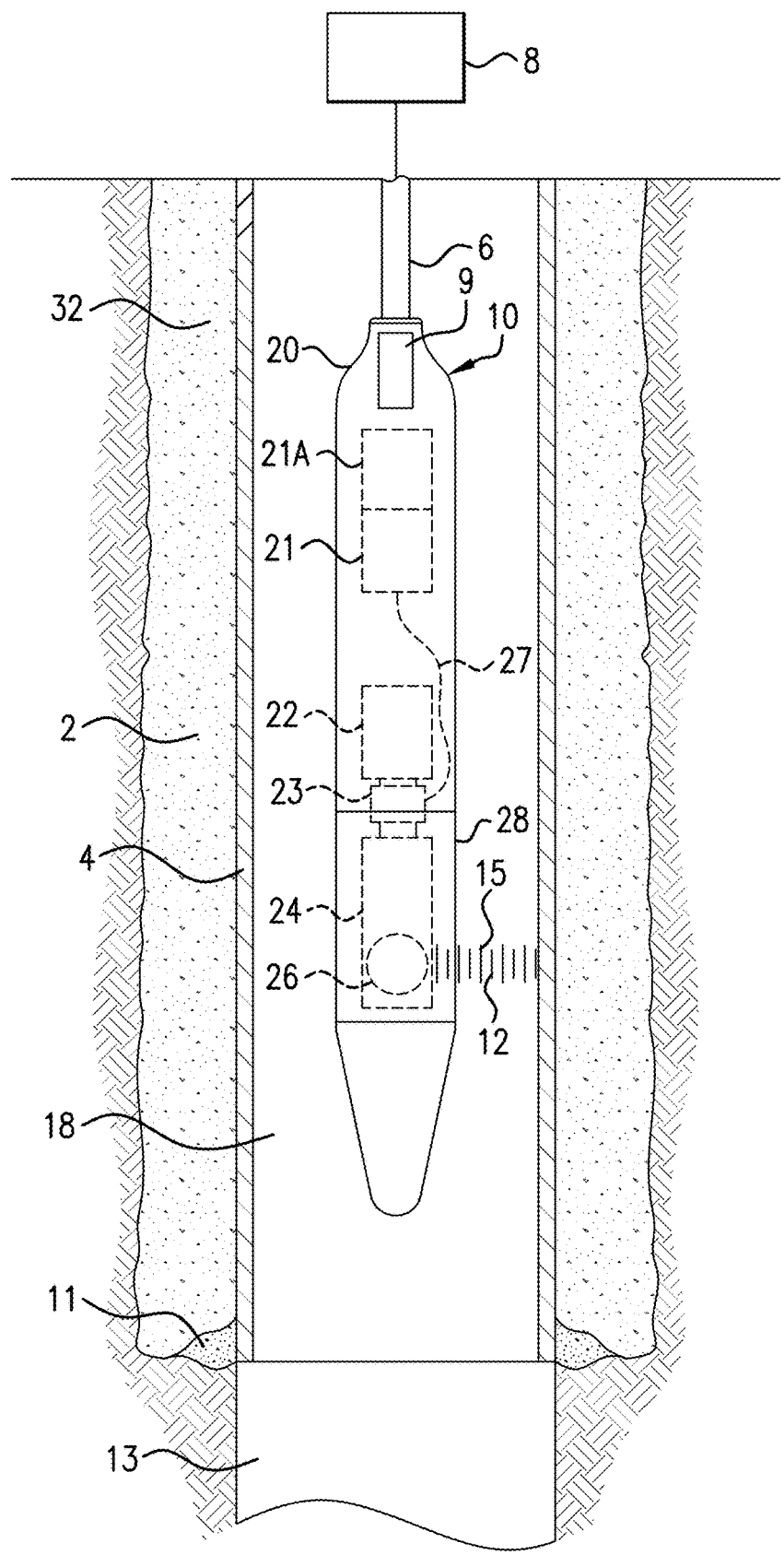
FIG. 2 is a cross-sectional view of the acoustic tool.

FIG. 2 shows the tool 10 in more detail. The tool 10 is connected to one end of the cable 6 and includes a housing 20 which contains a transducer head 24 rotated by an electric motor 22 or by whole tool rotation using another conveyance method, e.g. a rotating drill string. Rotation of the transducer head 24 enables evaluation of substantially all the circumference of the wellbore 2 and casing 4 by enabling acoustic pulses 12 to be aimed at and reflections 15 received from various angular positions around the axis of the wellbore 2 or casing 4. The transducer head 24 is located within an acoustically transparent cell 28. The acoustic pulses 12 and the reflections 15 can easily pass through the cell 28. The acoustic pulses 12 are generated, and the reflections 15 are received by a piezoelectric element 26 contained within the transducer head. The piezoelectric element 26 may be constructed with an internal focusing feature so that the emitted acoustic pulses 12 have an extremely narrow beam width, generally about ⅓ of an inch in a non-limiting embodiment. Narrow beam width enables high resolution of small features in the wellbore 2. The piezoelectric element 26 emits the acoustic pulses 12 upon being energized by electrical impulses from a transceiver circuit 21. The electrical impulses are conducted through an electromagnetic coupling 23 which enables rotation of the transducer head 24. After transmitting the acoustic pulse 12, the transceiver circuit 21 is programmed to receive a time-varying electrical voltage 27 generated by the piezoelectric element 26 as a result of the reflections 15 striking the piezoelectric element 26. The transceiver circuit 21 also comprises an analog-to-digital converter 21A which converts the resulting time-varying electrical voltage 27 into a plurality of numbers, which may also be known as samples, representing the magnitude of the time-varying electrical voltage 27 sampled at spaced-apart time intervals. The plurality of numbers is transmitted to the surface logging unit 8 through the cable 6.

The tool 10 may include downhole electronics 9 for processing data such as the time-varying electrical voltage 27 downhole. The downhole electronics may also be configured to act as a telemetry interface for transmitting data to and/or receiving commands from the surface.

Figure 3:
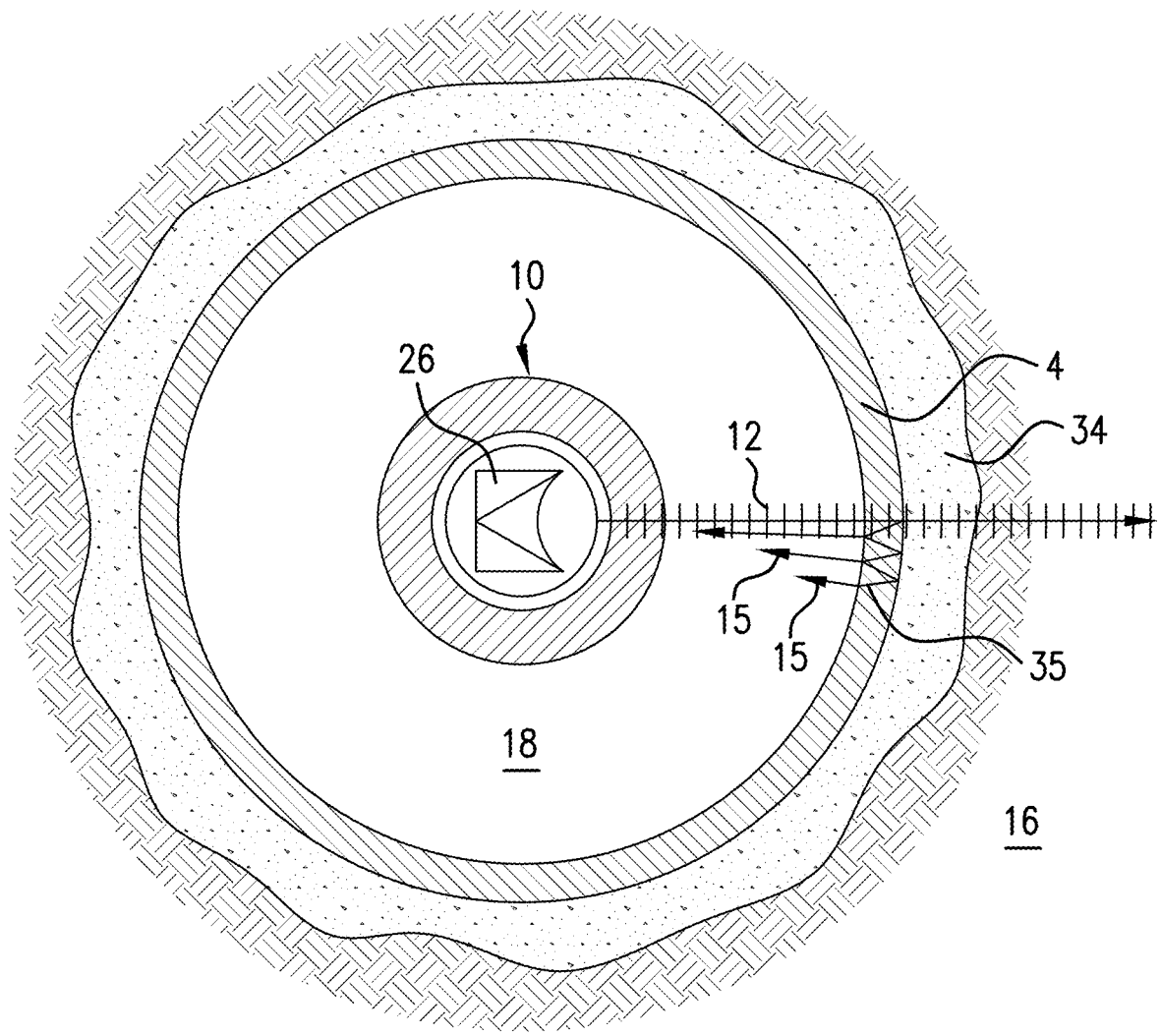
FIG. 3 depicts aspects of acoustic energy travel paths from the acoustic tool to the wellbore wall and associated reflections.

FIG. 3 shows one principle of operation of the tool 10 in more detail as it relates to determining the thickness of the casing 4. The tool 10 is suspended substantially in the center of the wellbore 2. The acoustic pulses 12 emitted by the tool 10 travel through the fluid 18 filling the wellbore until they contact the casing. Because the acoustic velocity of the casing 4 and the fluid 18 are generally quite different, an acoustic impedance boundary is created at the interface between the casing 4 and the fluid 18. Some of the energy in the acoustic pulse 12 will be reflected back toward the tool 10. Some of the energy of the acoustic pulse 12 will travel through the casing 4 until it reaches the interface between the casing 4 and cement 34 in the annular space between the borehole 2 and the casing 4. The acoustic velocity of the cement 34 and the acoustic velocity of the casing 4 are generally different, so another acoustic impedance boundary is created. As at the fluid casing interface, some of the energy of the acoustic pulse 12 is reflected back towards the tool 10, and some of the energy travels through the cement 34. Energy reflected back towards the tool 10 from the exterior surface of the casing 4 will undergo a further partial reflection 35 when it reaches the interface between the fluid 18 in the wellbore 2 and the casing 4. The acoustic energy absorbed by the casing 4 will be greatest at the resonant frequency of the casing 4 because the wavelength of the energy at the resonance frequency is such that the partial reflections tend to become trapped in the casing. The acoustic energy detected by the tool 10 within the reflection 15 will show evidence of energy captured or trapped at the resonant frequency of the casing 4. The resonant frequency of the casing 4 is a function of the thickness of the casing 4 and the velocity of sound in the casing 4. The velocity of sound in the casing 4 can be determined by measurement at the earth's surface, or inferred from knowledge of the material composition of the casing 4. Thickness of the casing 4 can be determined by determining the resonant frequency of the casing as indicated by analysis of the acoustic energy contained in the reflection 15.

Various analytical methods for determining the resonant frequency of a tubular such as the casing 4 are now discussed. U.S. Pat. No. 5,491,668 discusses a method that applies a Fourier transform to acoustic data and is incorporated by reference herein in its entirety.

Method 1

Figure 4A:
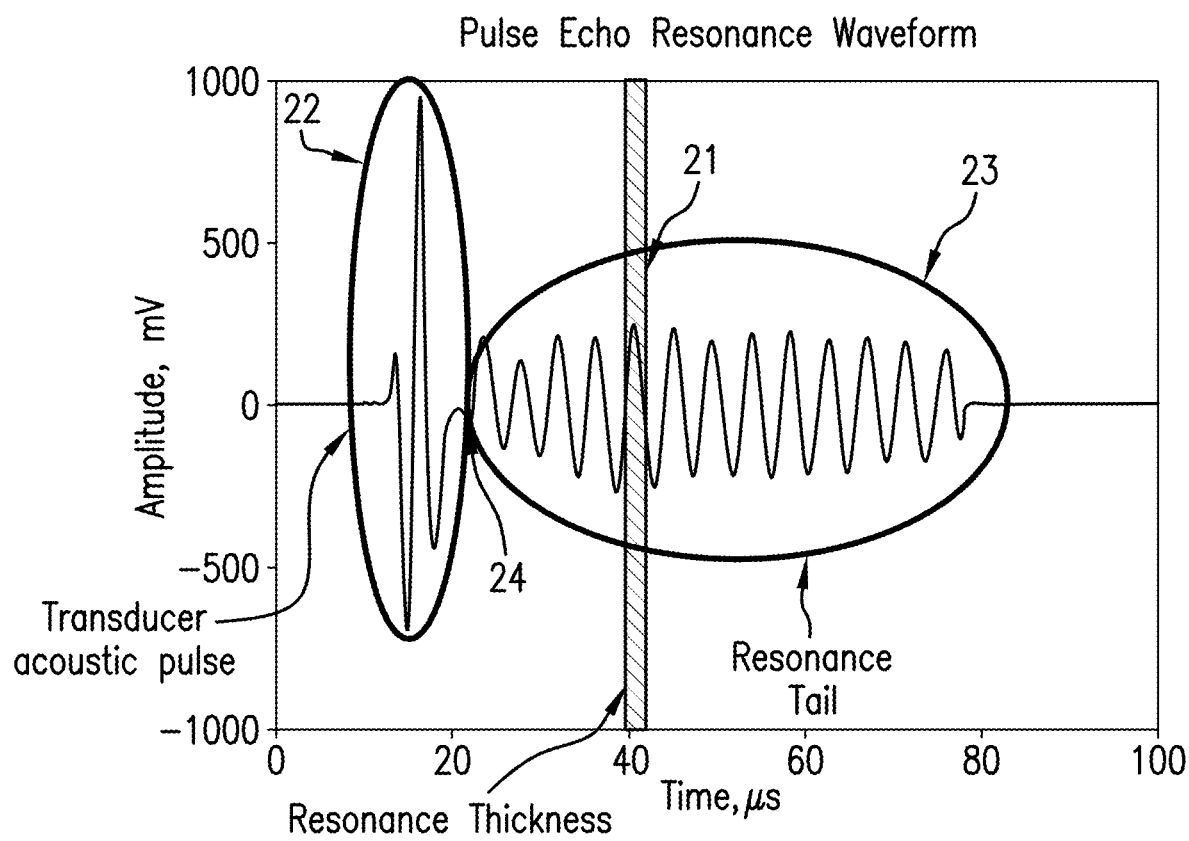
FIGS. 4a and 4b depict aspects of time-varying voltage for an acoustic pulse echo return signal with a casing resonance waveform.

In a first method (method 1), a Fourier transform is applied to the acoustic time-varying waveform data obtained downhole to compute an amplitude spectrum and phase (not shown) transforming the waveform data into the frequency domain. One example of time-varying acoustic waveform data is illustrated in FIG. 4a. One example of the amplitude spectrum in the frequency domain is illustrated as curve 50 in FIG. 5. A notch 51 in the amplitude spectrum curve 50 is indicative of the resonant frequency due to the energy captured at the resonant frequency. The acoustic energy slowly bleeds off, creating a time domain tail in the amplitude spectrum, illustrated at 23 in FIG. 4a. The frequency of this resonance tail is a function of casing thickness and the speed of sound in the casing. Depending on the noise level within the signal, multiple notches may appear in the amplitude spectrum, detecting the correct notch could be unreliable.

Method 2

Figure 4B:
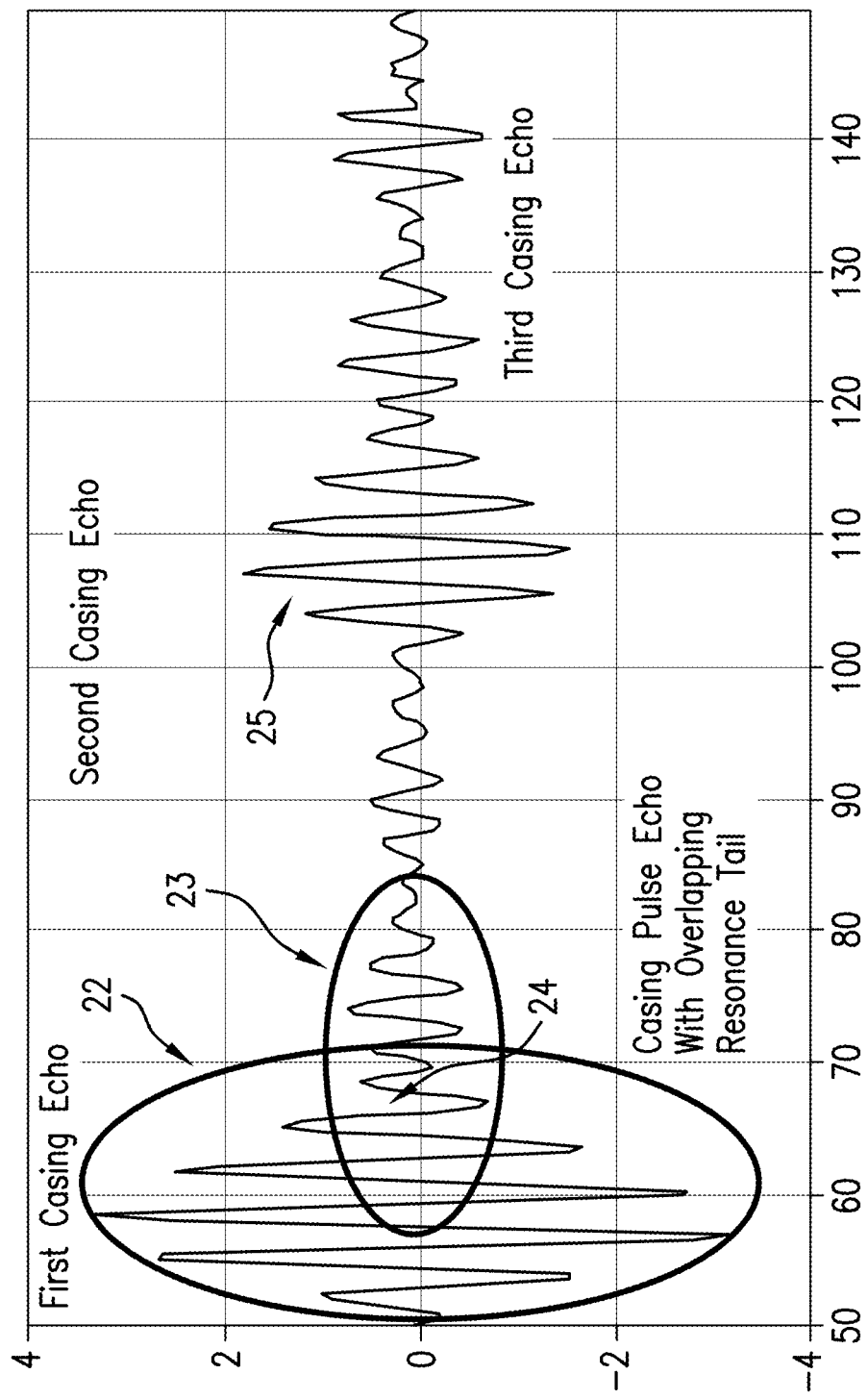
Figure 6:
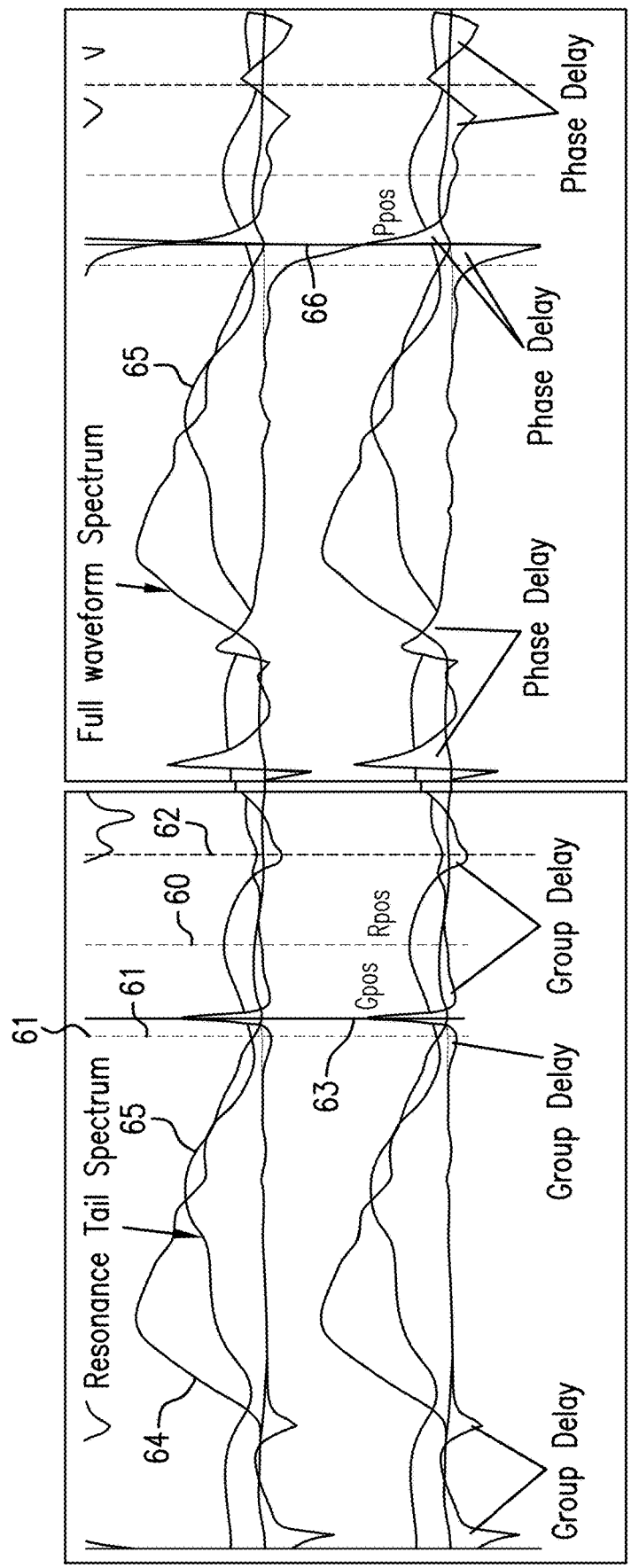
FIG. 6 depicts aspects of a resonance tail spectrum, a real component group delay function, and an imaginary component phase delay function.

With respect to the first method, detection of the spectral notch 51 may be difficult, due to the nature of the amplitude spectrum such as having increasing signal noise. In these instances, a second method (method 2) is used in which a positive peak in a broad tail end of the waveform data in the frequency domain may be used to identify the resonant frequency. In the time domain plot of the pulse echo resonance waveform, FIG. 4a, the short transducer acoustic pulse can be distinguished from the resonance tail. In the absence of a casing resonance, the transducer acoustic pulse has a short time span, as indicated by the oval 22 enclosing the transducer pulse. The resonance, as indicated by the oval 23, can be clearly distinguished from the transducer acoustic pulse. If the waveform data is split at the intersection of the two ovals 24, the left half will contain the transducer acoustic pulse 22, and the right half will contain the resonance tail 23. When split into two separate waveforms, each can be processed independently. The resonance tail always occurs after the transducer acoustic pulse; however, depending of the shape of the transducer acoustic signal there will be varying degrees of overlapping. This overlapping if severe enough may make this method challenging as illustrated at 24 in FIG. 4b. This waveform also contains multiple reflections between the transducer and the casing. These multiple reflections make the spectral analysis more complicated as the multiple reflections modify the entire spectrum. FIG. 6 illustrates a broad resonance tail spectrum, gray fill, of the waveform data and a positive peak at 60. Unfortunately, the broad resonance tail peak limits accuracy of peak position, and thickness and the resonance tail is susceptible to interference from transducer lateral modes 64. In addition, transducer lateral modes can shift peak position and/or cause false peaks leading to erroneous results. The broad resonance tail peak and susceptibility make this second method less reliable than is desired.

Method 3

In a third method (method 3), a peak in a real component waveform of a complex group delay function determined in the frequency domain as discussed below is used to identify the resonant frequency. The real component waveform of the complex group delay determined in the frequency domain from the time domain waveform data is determined as follows. Each reflection is digitized into a first plurality of numbers. Each number of the first plurality of numbers has an index value which represents the ordinal position of each number in the first plurality of numbers. The first plurality of numbers is used to calculate a first Fast Fourier transform. The output of the first Fast Fourier transform is a first plurality of coefficient pairs representing real coefficients and imaginary coefficients of the first Fast Fourier transform. The real coefficients and the imaginary coefficients are computed by the relationships:

$$A_k = \frac{2}{N} \sum_i f_i \cos\left(\frac{2\pi k i}{N}\right) \quad (1)$$

$$B_k = \frac{2}{N} \sum_i f_i \sin\left(\frac{2\pi k i}{N}\right) \quad (2)$$

(Note: in these equations the space ( ) is the symbol for implied multiplication.)
where $f_i$ is a number in the first plurality of numbers, k is the wave number, N is the total quantity of numbers in the first plurality of numbers, Ak and Bk are, respectively the real and imaginary Fourier coefficients and i is the index value and the ordinal position of each sample in the plurality of numbers. The Fourier transform as a function of the wavenumber $F_k$ is calculated by:

$$F_k = \mathfrak{F}(f_i)_k = A_k + jB_k, \ j=\sqrt{-1} \quad (3)$$

where $\mathfrak{F}$ is the discrete Fourier transform as a function of frequency.

The phase $\phi$, as a function of wavenumber, can be calculated by the relationship:

$$\phi_k = \tan^{-1}\left(-\frac{B_k}{A_k}\right) \quad (4)$$

The present discussion regarding the third method bypasses the step of explicitly calculating the phase. The relationship between phase and wavenumber is shown in order to demonstrate the relationship of the phase to the desired value, which is the real component of the group delay.

The group delay is defined as the first derivative of the phase as a function of frequency. In the case of the discrete Fourier transform, the group delay is defined as the derivative of phase with respect to the wave number k. Therefore the group delay function can be defined as:

$$g_k = \frac{d}{dk}\phi_k = \frac{d}{dk}\left(\tan^{-1}\left(-\frac{B_k}{A_k}\right)\right) \quad (5)$$

which, upon calculating the differentiation converts to:

$$g_k = -\frac{B_k \frac{d}{dk}A_k - A_k \frac{d}{dk}B_k}{A_k^2 + B_k^2} \quad (6)$$

The expression for group delay in equation 6 has terms for the first derivative with respect to the wavenumber of the real coefficients and the imaginary coefficients calculated as a result of the first Fast Fourier transform. The first derivative functions of the first plurality of coefficient pairs can be calculated by the following relationships:

$$\frac{d}{dk}A_k = \frac{d}{dk}\left\{\frac{2}{N}\sum_i \left[f_i \cos\left(\frac{2\pi k i}{N}\right)\right]\right\} \quad (7)$$

The expression of equation 7 can be rewritten as:

$$\frac{d}{dk}A_k = \frac{2}{N}\sum_i \left[f_i \frac{d}{dk}\cos\left(\frac{2\pi k i}{N}\right)\right] \quad (8)$$

which upon differentiation becomes:

$$\frac{d}{dk}A_k = \frac{-4\pi}{N^2}\sum_i \left[i f_i \sin\left(\frac{2\pi k i}{N}\right)\right] \quad (9)$$

Similarly for the imaginary coefficients:

$$\frac{d}{dk}B_k = \frac{d}{dk}\left\{\frac{2}{N}\sum_i \left[f_i \sin\left(\frac{2\pi k i}{N}\right)\right]\right\} \quad (10)$$

-continued $$\frac{d}{dk}B_k = \frac{2}{N}\left\{\sum_i\left[f_i\frac{d}{dk}\sin\left(\frac{2\pi ki}{N}\right)\right]\right\} \quad (11)$$

$$\frac{d}{dk}B_k = \frac{4\pi}{N^2}\sum_i\left[if_i\cos\left(\frac{2\pi ki}{N}\right)\right] \quad (12)$$

Substituting equation 9 and equation 12 into equation yields the relationship:

$$g_k = \cfrac{B_k\cfrac{-4\pi}{N^2}\sum_i\left[if_i\sin\left(\frac{2\pi ki}{N}\right)\right] + A_k\cfrac{4\pi}{N^2}\sum_i\left[if_i\cos\left(\frac{2\pi ki}{N}\right)\right]}{A_k^2 + B_k^2} \quad (13)$$

Equation 13 can be rewritten more simply as:

$$g_k = \frac{-4\pi}{N^2}\cfrac{B_k\sum_i\left[if_i\sin\left(\frac{2\pi ki}{N}\right)\right] - A_k\sum_i\left[if_i\cos\left(\frac{2\pi ki}{N}\right)\right]}{A_k^2 + B_k^2} \quad (14)$$

Equation 14 contains summation terms similar in form to the Fourier coefficient term definitions from equations 1 and 2. Using the definition of the Fourier coefficients defined in equations 1 and 2, it is then possible to calculate a second plurality of coefficient pairs representing the result of a second Fast Fourier transform on a second plurality of numbers. The second plurality of numbers is calculated by multiplying each number in the first plurality of numbers by the index value corresponding to each number. The real coefficients and the imaginary coefficients calculated as a result of the second Fast Fourier transform are defined as:

$$C_k = \frac{2}{N}\sum_i\left[if_i\cos\left(\frac{2\pi ki}{N}\right)\right] \quad (15)$$

$$D_k = \frac{2}{N}\sum_i\left[if_i\sin\left(\frac{2\pi ki}{N}\right)\right] \quad (16)$$

The second discrete Fourier transform can be calculated in a manner similar to that shown in equation 3:

$$H_k = \mathfrak{F}(if_i) = C_k + jD_k \quad (17)$$

Equation 14, the expression for group delay, can therefore be rewritten as:

$$g_k = \frac{-2\pi}{N}\frac{A_kC_k + B_kD_k}{A_k^2 + B_k^2} \quad (18)$$

which is an explicit determination of the group delay calculated without computing the phase.

Because the discrete Fourier transform is defined as:

$$\mathfrak{F}(f_i)_k = A_k + jB_k \quad (19)$$

and multiplication by the complex conjugate yields:

$$\mathfrak{F}(f_i)_k \mathfrak{F}(f_i)_k^* = A_k^2 + jB_k^2 \quad (20)$$

which is the denominator of the second term in equation 18, wherein the superscript asterisk (*) in equation 20 indicates the complex conjugate. From equations 17 and 19 it is known that the product of the first discrete Fourier transform and the complex conjugate of the second Fourier transform yields:

$$\mathfrak{F}(f_i)_k \mathfrak{F}(f_i)_k^* = A_kC_k + B_kD_k + j(A_kD_k - B_kC_k) \quad (21)$$

Therefore equation 18 can be rewritten as:

$$g_k = \frac{-2\pi}{N}\frac{\mathfrak{F}(f_i)_k \mathfrak{F}(if_i)_k^*}{\mathfrak{F}(f_i)_k \mathfrak{F}(f_i)_k^*} \quad (22)$$

where the real component term is the numerator of the second term in equation 18. The group delay is the real part of the expression for $g_k$, which can be expressed as:

$$G_k = \frac{-2\pi}{N}\mathbb{R}\left(\frac{\mathfrak{F}(f_i)_k \mathfrak{F}(if_i)_k^*}{\mathfrak{F}(f_i)_k \mathfrak{F}(f_i)_k^*}\right) \quad (23)$$

$$P_k = \frac{-2\pi}{N}\mathbb{I}\left(\frac{\mathfrak{F}(f_i)_k \mathfrak{F}(if_i)_k^*}{\mathfrak{F}(f_i)_k \mathfrak{F}(f_i)_k^*}\right) \quad (24)$$

where $\mathbb{R}$ and $\mathbb{I}$ indicate the real and imaginary parts of the argument, respectively.

Calculation of the group delay can be performed by simultaneous Fast Fourier transforms of the first plurality of numbers and the second plurality of numbers to save calculation time.

After computation of the group delay function, the relative amplitudes of the reflection energy at various frequencies is evaluated to determine a frequency range in which there is sufficient energy in the reflection to evaluate the group delay curve. After the Fast Fourier transforms are completed, a third plurality of numbers is calculated from the first plurality of coefficient pairs, by calculating the square root of the sum of the squares of each of the first plurality of coefficient pairs. The third plurality of numbers represents the relative amplitudes of the component frequencies of the acoustic energy in the reflection. The third plurality of numbers is scanned over its entire range of frequencies, and a frequency at which a peak value of relative amplitude occurs is selected. The third plurality of numbers is then scanned for a lowest frequency and a highest frequency between which the relative amplitude remains greater than a preselected portion of the peak value. The portion selected in one or more embodiments is 4 percent of the peak value. In examination of several plots of amplitude as a function of frequency, at relative amplitudes above 4 percent of the peak value the reflection subjectively appeared to have a signal strength great enough to reliably perform the analysis of the group delay. The subjective criterion used to pick the 4 percent discrimination level was an appearance in the amplitude plot of a smooth roll-off of amplitude away from the transmitter center frequency of about 250 kHz. Below 4 percent of the peak amplitude, the plots had a "noisy" character or jagged appearance. Other selection criterion may also be used.

The real component of the complex group delay function, defined by the second plurality of coefficient pairs, is then scanned between the lowest frequency and the highest frequency. The maximum value found in the scan occurs at the resonant frequency of the casing, since there is a slight delay in the reflection time of energy at the resonant frequency of the casing, in particular because of the internal multiple reflections within the casing of energy at the resonant frequency of the casing. The group delay curve represents the first derivative of phase with respect to frequency, the slope of which derivative represents the time delay from the emission of the acoustic pulse to reception of the reflection. The group delay curve (i.e., real component)

will tend to peak at disturbances in reflection time. An example of the real component of the group delay function is shown as number 52 in FIG. 5 with a real component peak at 53. Another example of a peak of the real component of the group delay function is illustrated at 63 in FIG. 6. The thickness of the casing can then be determined from the resonant frequency of the casing by the relationship (t=c/2*f), where t is the thickness of the casing, f is the resonant frequency, and c is the speed of sound in the casing. The factor of 2 is present because the energy has to cross the casing twice in order to return to the transducer.

Method 4

Figure 5:
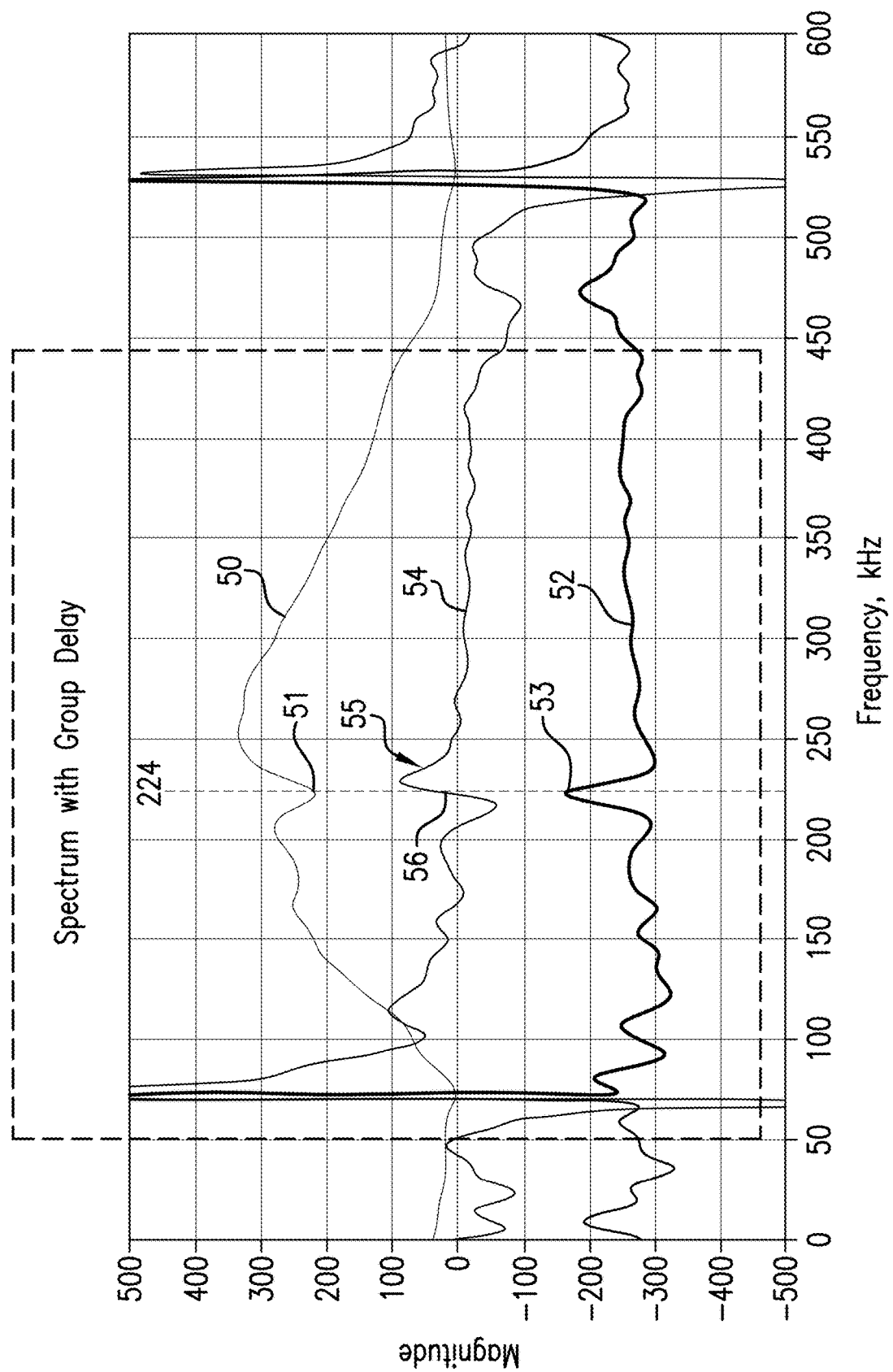
FIG. 5 depicts aspects of results of processing the acoustic pulse echo resonance waveform using three different methods.

In a fourth method (method 4), the imaginary component of the group delay function is used to identify the resonant frequency. The group delay function G discussed above with respect to method 3 can be summarized as:

$$G = \frac{-2\pi}{N}\left(\frac{\mathfrak{F}(\omega)\mathfrak{F}(f\omega)^*}{\mathfrak{F}(\omega)\mathfrak{F}(\omega)^*}\right) \quad (25)$$

where $\mathfrak{F}(\omega)$ is the Fourier Transform of waveform and $\mathfrak{F}(f\omega)^*$ is the complex conjugate (*) of the derivative of frequency with respect to phase and co is the angular frequency. G may be expressed as:

$$G = g + jp \quad (26)$$

where the group delay is the real part of G, namely g, and the phase delay is the imaginary part of G, namely p. One example of the curve of p with respect to frequency is illustrated in FIG. 5 at 54. As seen in FIG. 5, the phase delay curve p includes a bipolar peak pair at 55. As disclosed herein with respect to the fourth method, the resonant frequency is identified in the phase delay curve p at the inflection point or zero-crossing point 56. FIG. 6 also illustrates an inflection point or zero-crossing point at 66.

Further Processing to Increase Accuracy

Each of the methods discussed above may have issues that result in the resonant frequency being difficult to identify or being askew from the actual resonant frequency. For example, the notch in method 1 may not be readily detectable algorithmically and it may become difficult to detect with increasing signal noise. With respect to method 2, the broad resonance tail peak may limit accuracy of peak position, such as at 60 in FIG. 6, and thus thickness. In addition, the resonance tail may be susceptible to interference from transducer lateral modes, which can result in shifts of peak position and/or cause false peaks, such as at 65 in FIG. 6. With respect to method 3, the group delay peak may sometimes have inverted polarity or may have an abnormal local resonance peak with proper polarity. With respect to method 4, multiple peaks may be present in a scan window leading to uncertainty of the correct inflection point. Consequently, the resonant frequencies as determined by multiple methods may be averaged or used together to increase the accuracy of the determination of the resonant frequency. Averaging may include weighted averaging with weight for each method being determined by the quality of the acoustic data. Other averaging methods may also be used.

In embodiments in which acoustic data is obtained by sampling and the sample values are binned, accuracy may be increased by interpolating between bins.

Figure 7:
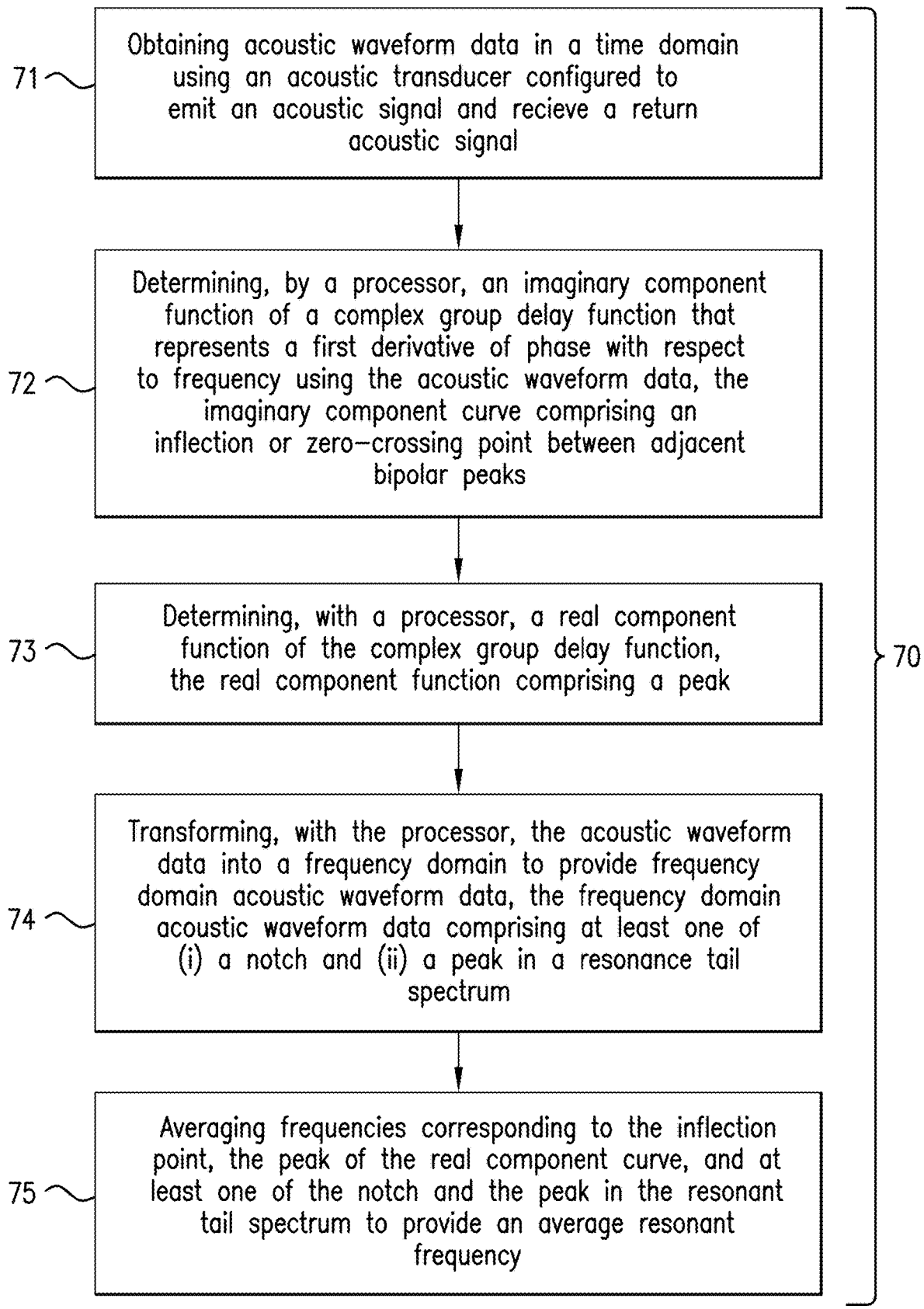
FIG. 7 is a flow chart for a method for characterizing a tubular disposed in a wellbore penetrating a subsurface formation.

FIG. 7 is a flow chart for a method 70 for characterizing a tubular disposed in a borehole penetrating a subsurface formation. Block 71 calls for obtaining acoustic waveform data in a time domain using an acoustic transducer configured to emit an acoustic signal and receive a return acoustic signal.

Block 72 calls for determining, by a processor, an imaginary component function of a complex group delay function that represents a first derivative of phase with respect to frequency using the acoustic waveform data, the imaginary component function comprising an inflection or zero-crossing point between adjacent bipolar peaks. In general, the slope of the first derivative represents a time delay from the emission of the acoustic signal to reception of the return acoustic signal to provide a phase delay curve or function. Block 72 may include identifying a frequency at the inflection point as a resonant frequency that represents a thickness of the tubular.

Block 73 calls for determining, with the processor, a real component function of the complex group delay function, the real component function comprising a peak. Block 73 may also include identifying a frequency at the peak as a resonant frequency that represents a thickness of the tubular.

Block 74 calls for transforming, with the processor, the acoustic waveform data into a frequency domain to provide frequency domain acoustic waveform data, the frequency domain acoustic waveform data comprising at least one of (i) a notch and (ii) a peak in a resonance tail spectrum. Block 74 may also include identifying at least one of a frequency at the notch and a frequency at the peak as a resonant frequency that represents a thickness of the tubular.

Block 75 calls for averaging frequencies corresponding to the inflection point, the peak of the a real component curve, and at least one of the notch and the peak in the resonant tail spectrum to provide an average resonant frequency. Block 75 may also include determining a thickness of the tubular using the average resonant frequency.

Figure 8:
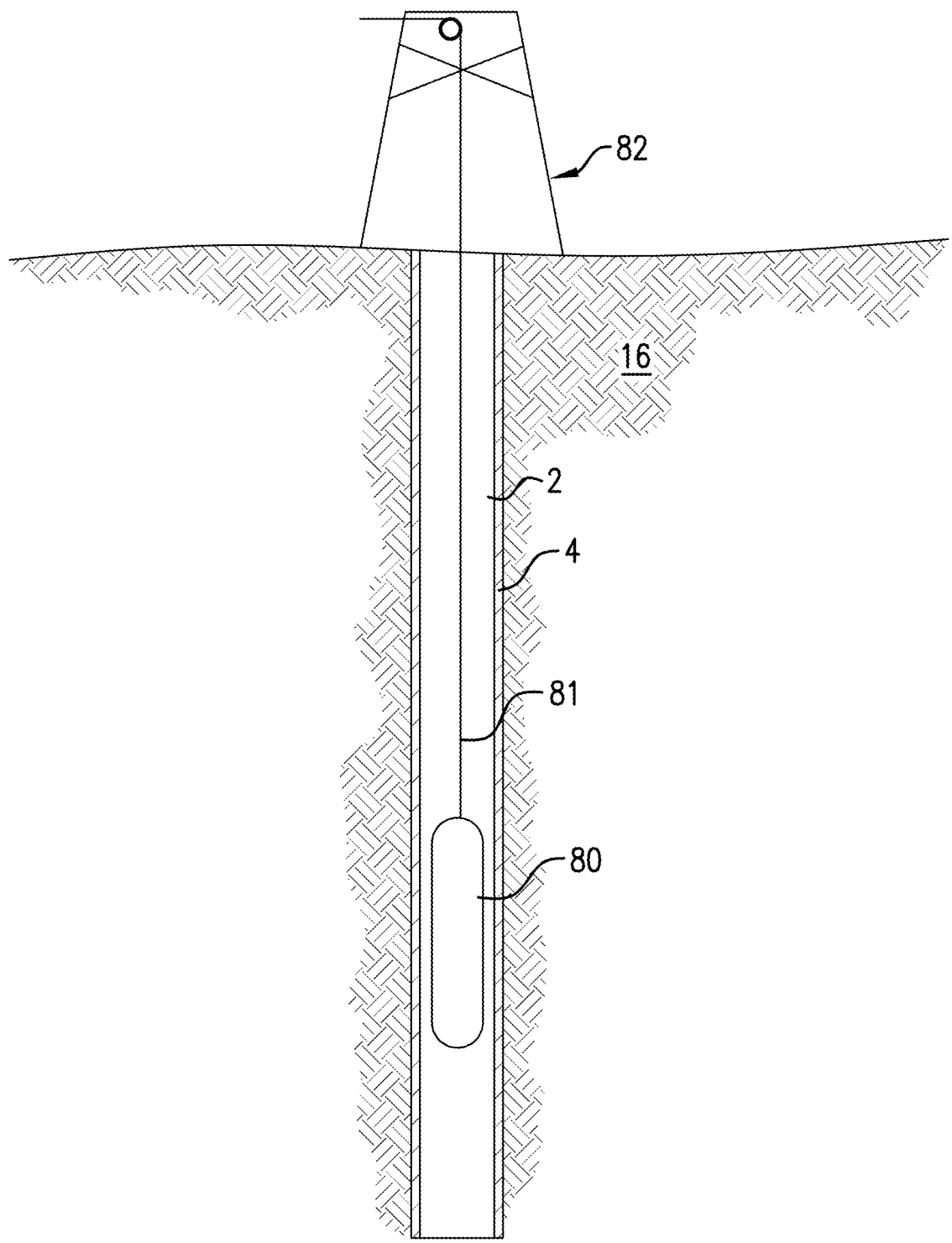
FIG. 8 depicts aspects of equipment for performing a borehole-related operation.

The method 70 may also include performing a borehole-related physical operation using the characterization of the tubular. For example, if the characterization includes determining the thickness of the tubular or casing, then the borehole-related physical action may include (1) perforating the tubular or casing with the proper amount charge for perforating that thickness or (2) cutting the tubular or casing with a cutter configured to cut that thickness as non-limiting embodiments. Other remedial actions may be performed to preserve casing and/or well integrity. FIG. 8 illustrates an embodiment of borehole-related equipment or tool 80 disposed in the borehole 2 and configured to perform a borehole-related physical operation. The tool 80 may be conveyed by a carrier 81 such as a wireline, cable, drill string, or coiled tubing in non-limiting embodiments. The tool 80 may be operated by topside equipment 82 based on the characterization of the tubular or casing 4.

One method for finding the inflection point in a phase delay curve is now discussed. The method may include normalization of data to put the inflection point on or near the zero axis of the phase delay curve.

Stage 1: Within a predefined window, find the peak of the resonance tail, within a narrower window search the phase delay for a negative to positive zero crossing, if a negative to positive zero crossing is found, then skip to stage 5.

Stage 2: Then if a negative to positive zero crossing is not found, find the positive peak of the group delay and repeat the search for a negative to positive zero crossing. If a negative to positive zero crossing is found, skip to stage 5.

Stage 3: Then if a negative to positive zero crossing is not found, find the negative peak of the group delay and repeat the search for a negative to positive zero crossing. If a negative to positive zero crossing is found, skip to stage 5.

Stage 4: Then if a negative to positive zero crossing is not found, find the negative and positive peaks of the phase delay and repeat the search for a negative to positive zero crossing. Start with a few samples before negative peak and end with a few samples after the positive peak.

Stage 5: By linear interpolation of the phase delay, compute the frequency at the zero crossing (i.e., the inflection point). At each processing step, the processing window for the phase delay is narrower than the initial scan windows.

Various aspects of methods for determining a resonant frequency for characterizing a downhole tubular are now discussed with respect to FIG. 6.

Between provided CTHKMIN (selected minimum value) and CTHKMAX (selected maximum value) indices, find resonance tail peak, see dashed line at 60.
  Or using an algorithmically computed CTHKMIN and CTHKMAX, find resonance tail peak, see dashed line at 60.
  Within the window defined by CTHKMIN and CTHKMAX, represented as dashed line 61 and dashed line 62, respectively, find group delay peak index (see black line 63) and phase delay zero crossing index (see black line 66).
  Average indexes, resonance tail, group, and phase and from average index calculate thickness of tubular.
  FIG. 6 illustrates some potential problems. For example, the resonance tail peak is not at correct frequency, competing transducer lateral mode resonances can be larger than resonance tail and cause tail center frequency to shift.

One method includes the following aspects referring to FIG. 6:

Compute nominal casing thickness from outer diameter and linear density or look up the nominal casing thickness in standard table of casing outer diameters and casing weights (API thickness). See for example Baker Oil Tools, Technical Information for Completions, Workovers, and Fishing, Published by Baker Hughes Incorporated, U.S.A., September 2001, Table: Dimensional Data and Minimum Performance Properties of Casing, Section 6, pp 6-2 to 6-45.
  Compute nominal resonance index (NRI) from the nominal casing thickness.
  Window should include NRI such that, CTHKMIN<NRI<CHTKMAX.
  Find negative to positive phase zero crossing. Scan for positive slope zero crossing at the following:
  Resonance tail, scan between $R_{pos} \pm 10$ for example (+/− refers to number of sample bins).
  If not found, find positive group peak, scan $G_{pos} \pm 10$
  If not found, find negative group, scan $G_{neg} \pm 10$ (not shown)
  If not found, find phase peaks, repeat scan, $P_{neg}-5$ to $P_{pos}+5$
  Use zero crossing to compute thickness.
  Multiple measurements may be required based on data quality.

Embodiment 1: A method for characterizing a tubular, the method including obtaining acoustic waveform data in a time domain using an acoustic transducer configured to emit an acoustic signal and receive a return acoustic signal; transforming, by a processor, the acoustic waveform data into a frequency domain using a frequency domain transform to provide frequency domain acoustic waveform data; determining, by a processor, a complex group delay function $G_k$ derived from the frequency domain acoustic waveform data to provide a phase delay function as a function of frequency, wherein the complex group delay function $G_k$ represents a first derivative of phase in the frequency domain with respect to frequency; determining, by the processor, an imaginary component function of the complex group delay function $G_k$ to provide a phase delay function as a function of frequency; and characterizing, by the processor, the tubular using the phase delay function.

Embodiment 2: The method according to any prior embodiment, wherein characterizing includes determining a thickness of the tubular.

Embodiment 3: The method according to any prior embodiment, wherein using the phase delay function includes determining a resonant frequency at an inflection point or zero crossing point between a negative peak and a positive peak on the phase delay function.

Embodiment 4: The method according to any prior embodiment, further including determining a real component function of the complex group delay function $G_k$ to provide a group delay function as function of frequency.

Embodiment 5: The method according to any prior embodiment, further including identifying a first peak in the group delay function.

Embodiment 6: The method according to any prior embodiment, further including identifying at least one of (i) a notch in the frequency domain acoustic waveform data and (ii) a second peak in a resonant tail of the frequency domain acoustic waveform data.

Embodiment 7: The method according to any prior embodiment, further including algorithmically computing a window having a minimum value and a maximum value that encompasses the second peak and searching for the second peak within the window.

Embodiment 8: The method according to any prior embodiment, further including averaging a resonant frequency corresponding to the inflection point of zero crossing, the first peak, and the at least one of the notch and the second frequency to provide an averaged resonant frequency.

Embodiment 9: The method according to any prior embodiment, wherein characterizing includes using the averaged resonant frequency.

Embodiment 10: The method according to any prior embodiment, wherein the tubular is disposed in a borehole penetrating a subsurface formation and the method further includes conveying the acoustic transducer through the borehole using a carrier.

Embodiment 11: The method according to any prior embodiment, wherein the carrier includes at least one of a wireline, a drill string, or coiled tubing.

Embodiment 12: The method according to any prior embodiment, further comprising rotating the acoustic transducer while the acoustic transducer is being conveyed through the borehole.

Embodiment 13: The method according to any prior embodiment, further including performing a borehole-related physical operation using the characterization of the tubular.

Embodiment 14: An apparatus for characterizing a tubular disposed in a borehole penetrating a subsurface formation, the apparatus including an acoustic transducer configured to emit and receive an acoustic signal to provide to provide acoustic waveform data in a time domain; and a processor configured to transform the acoustic waveform data in the time domain into a frequency domain using a frequency domain transform to provide frequency domain acoustic waveform data; determine a complex group delay function $G_k$ derived from the frequency domain acoustic waveform data to provide a phase delay function as a function of frequency, wherein the complex group delay function $G_k$ represents a first derivative of phase in the frequency domain with respect to frequency; determine an imaginary component function of the complex group delay function $G_k$ to provide a phase delay function as a function of frequency; and characterize the tubular using the phase delay function.

Embodiment 15: The apparatus according to any prior embodiment, wherein the processor is further configured to determine a real component function of the group delay function, the real component function including a peak.

Embodiment 16: The apparatus according to any prior embodiment, wherein the processor is further configured to transform the acoustic waveform data into a frequency domain to provide frequency domain acoustic waveform data, the frequency domain acoustic waveform data including at least one of (i) a notch and (ii) a peak in a resonance tail spectrum.

Embodiment 17: The apparatus according to any prior embodiment, wherein the processor is further configured to average a resonant frequency associated with the inflection or zero-crossing point, a resonant frequency associated with the peak of the real component curve, and a resonant frequency associated with the at least one of the notch and the peak in the resonance tail spectrum to provide an average resonant frequency.

Embodiment 18: The apparatus according to any prior embodiment, wherein the processor is further configured to determine the thickness of the tubular using the average resonant frequency.

Embodiment 19: The apparatus according to any prior embodiment, further including borehole-related equipment configured to perform a borehole-related physical operation.

Embodiment 20: The apparatus according to any prior embodiment, wherein the borehole-related physical operation is at least one of perforating, cutting the tubular or other remedial action to preserve casing and/or well integrity.

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

In support of the teachings herein, various analysis components may be used, including a digital and/or an analog system. For example, the surface logging unit 8 and/or downhole electronics 9 may include digital and/or analog systems. The system may have components such as a processor, storage media, memory, input, output, communications link (wired, wireless, optical or other), user interfaces (e.g., a display or printer), software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply, magnet, electromagnet, sensor, electrode, transmitter, receiver, transceiver, antenna, controller, optical unit or components, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured.

The flow diagram depicted herein is just an example. There may be many variations to this diagram or the steps (or operations) described therein without departing from the scope of the invention. For example, operations may be performed in another order or other operations may be performed at certain points without changing the specific disclosed sequence of operations with respect to each other. All of these variations are considered a part of the claimed invention.

The disclosure illustratively disclosed herein may be practiced in the absence of any element which is not specifically disclosed herein.

While one or more embodiments have been shown and described, modifications and substitutions may be made thereto without departing from the scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for characterizing a tubular, the method comprising:
    obtaining acoustic waveform data in a time domain using an acoustic transducer configured to emit an acoustic signal and receive a return acoustic signal;

transforming, by a processor, the acoustic waveform data into a frequency domain using a frequency domain transform to provide frequency domain acoustic waveform data;

determining, by the processor, a complex group delay function $G_k$ derived from the frequency domain acoustic waveform data, wherein the complex group delay function $G_k$ represents a first derivative of phase in the frequency domain with respect to frequency;

determining, by the processor, an imaginary component function of the complex group delay function $G_k$ to provide a phase delay function as a function of frequency; and characterizing, by the processor, the tubular using the phase delay function.

2. The method according to claim 1, wherein characterizing comprises determining a thickness of the tubular.

3. The method according to claim 1, wherein using the phase delay function comprises determining a resonant frequency at an inflection point or zero crossing point between a negative peak and a positive peak on the phase delay function.

4. The method according to claim 1, further comprising determining a real component function of the complex group delay function $G_k$ to provide a group delay function as function of frequency.

5. The method according to claim 4, further comprising identifying a first peak in the group delay function.

6. The method according to claim 5, further comprising identifying at least one of (i) a notch in the frequency domain acoustic waveform data and (ii) a second peak in a resonant tail of the frequency domain acoustic waveform data.

7. The method according to claim 6, further comprising algorithmically computing a window having a minimum value and a maximum value that encompasses the second peak and searching for the second peak within the window.

8. The method according to claim 6, further comprising averaging a resonant frequency corresponding to the inflection point of zero crossing, the first peak, and the at least one of the notch and the second frequency to provide an averaged resonant frequency.

9. The method according to claim 8, wherein characterizing comprises using the averaged resonant frequency.

10. The method according to claim 1, wherein the tubular is disposed in a borehole penetrating a subsurface formation and the method further comprises conveying the acoustic transducer through the borehole using a carrier, the carrier comprising at least one of a wireline, a drill string, or coiled tubing.

11. The method according to claim 10, further comprising rotating the acoustic transducer while the acoustic transducer is being conveyed through the borehole.

12. The method according to claim 1, further comprising performing a borehole-related physical operation using the characterization of the tubular.

13. An apparatus for characterizing a tubular disposed in a borehole penetrating a subsurface formation, the apparatus comprising:
an acoustic transducer configured to emit and receive an acoustic signal to provide to provide acoustic waveform data in a time domain; and
a processor configured to:
transform the acoustic waveform data in the time domain into a frequency domain using a frequency domain transform to provide frequency domain acoustic waveform data;
determine a complex group delay function $G_k$ derived from the frequency domain acoustic waveform data, wherein the complex group delay function $G_k$ represents a first derivative of phase in the frequency domain with respect to frequency;
determine an imaginary component function of the complex group delay function $G_k$ to provide a phase delay function as a function of frequency; and
characterize the tubular using the phase delay function.

14. The apparatus according to claim 13, wherein the processor is further configured to determine a real component function of the group delay function, the real component function comprising a peak.

15. The apparatus according to claim 14, wherein the frequency domain acoustic waveform data comprises at least one of (i) a notch and (ii) a peak in a resonance tail spectrum.

16. The apparatus according to claim 15, wherein the processor is further configured to average a resonant frequency associated an inflection or zero-crossing point in the imaginary component function, a resonant frequency associated with the peak of the real component curve, and a resonant frequency associated with the at least one of the notch and the peak in the resonance tail spectrum to provide an average resonant frequency.

17. The apparatus according to claim 16, wherein the processor is further configured to determine the thickness of the tubular using the average resonant frequency.

18. The apparatus according to claim 13, further comprising borehole-related equipment configured to perform a borehole-related physical operation.

19. The apparatus according to claim 18, wherein the borehole-related physical operation is at least one of perforating, cutting the tubular or other remedial action to preserve casing and/or well integrity.

20. A method for characterizing a tubular, the method comprising:
obtaining acoustic waveform data using an acoustic transducer configured to emit an acoustic signal and receive a return acoustic signal;
determining, by a processor, a complex group delay function $G_r$ derived from the acoustic waveform data; and
characterizing, by the processor, the tubular using a phase delay function derived from the complex group delay function $G_k$.

* * * * *